United States Patent
Zimmerman et al.

(10) Patent No.: US 7,355,924 B2
(45) Date of Patent: *Apr. 8, 2008

(54) 3-D FORWARD LOOKING SONAR WITH FIXED FRAME OF REFERENCE FOR NAVIGATION

(75) Inventors: Matthew Jason Zimmerman, Providence, RI (US); James Henry Miller, Kingston, RI (US)

(73) Assignee: Farsounder, Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/399,869

(22) Filed: Apr. 7, 2006

(65) Prior Publication Data
US 2007/0025183 A1 Feb. 1, 2007

Related U.S. Application Data

(63) Continuation of application No. 10/688,034, filed on Oct. 17, 2003, now Pat. No. 7,035,166.

(51) Int. Cl.
*G01S 15/89* (2006.01)
(52) U.S. Cl. .......................... 367/88; 367/131
(58) Field of Classification Search .................. 367/88, 367/129, 130, 131
See application file for complete search history.

(56) References Cited

U.S. PATENT DOCUMENTS

| | | | |
|---|---|---|---|
| 3,641,484 A * | 2/1972 | White et al. | 367/88 |
| 3,731,264 A | 5/1973 | Campbell et al. | 340/3 PS |
| 4,422,166 A | 12/1983 | Klein | 367/115 |
| 4,635,240 A | 1/1987 | Geohegan et al. | 367/89 |
| 4,974,213 A | 11/1990 | Siwecki | 367/88 |
| 5,200,931 A * | 4/1993 | Kosalos et al. | 367/88 |
| 5,537,367 A | 7/1996 | Lockwood et al. | 367/87 |
| 5,598,206 A | 1/1997 | Bullis | 348/81 |
| 6,084,827 A | 7/2000 | Johnson et al. | 367/103 |
| 6,226,227 B1 | 5/2001 | Lent et al. | 367/104 |
| 6,449,215 B1 * | 9/2002 | Shell | 367/7 |
| 6,868,041 B2 * | 3/2005 | Preston et al. | 367/88 |
| 2002/0126577 A1 * | 9/2002 | Borchardt | 367/88 |
| 2004/0208084 A1 * | 10/2004 | Guthmann | 367/88 |

* cited by examiner

*Primary Examiner*—Ian J Lobo
(74) *Attorney, Agent, or Firm*—Mark S. Leonardo; Shivani Kaul; Brown Rudnick Berlack Israels LLP

(57) ABSTRACT

An imaging sonar system develops three-dimensional images of the space below, to the sides, and forward of a ship relative to a fixed frame of reference. Various features permit the system to be used in non-military environments and make possible low cost with substantial capabilities.

19 Claims, 8 Drawing Sheets

3-D FORWARD LOOKING SONAR WITH FIXED FRAME OF REFERENCE FOR NAVIGATION

RELATED APPLICATION INFORMATION

This patent application is a continuation of U.S. Utility patent application Ser. No. 10/688,034, filed in the U.S. Patent and Trademark Office on Oct. 17, 2003 now U.S. Pat. No. 7,035,166.

BACKGROUND OF THE INVENTION

There are many types of sonar systems used for military, commercial, and recreational purposes. Generally, forward looking sonar systems are designed to build a 2 dimensional image along a single vertical or horizontal slice. More advanced systems are capable of building 3 dimensional images through a series of 2 dimensional pings pointed directly below the vessel with the direction of the 2 dimensional strip being perpendicular to the track of the vessel. This type of system is downward-looking and used for bottom mapping. At present commercial forward-looking navigation sonars in creating a 3 dimensional image from a single ping, having any array geometry are unknown.

In the field of interferometry, arrays of many receivers are used, which enable a user or an autonomous system controller to make precise angular measurements for long-range detection, imaging, object classification, obstacle avoidance, etc. The operating frequencies can vary between a few Hz for seismic applications to many Megahertz or Gigahertz for ultrasound and radio systems. The sensors are usually arranged in an array in order to improve the signal to noise ratio for better detection. In such an array, the receiver hardware must be replicated for each channel. Since the number of array elements can vary from a minimum of four to several thousand, the cost for the receiver hardware can be a real burden. Furthermore, in order to perform the additional operations required for detection, for example: beam forming and multi-beam processing; each sensor output must be connected to a central signal processor. Depending on the number of array elements, this can create a serious wiring burden. Finally, since the sensors detect analog signals while the central processing unit operates in the digital domain, each channel must be equipped with a high-resolution analog-to-digital converter (ADC). The complexity of these systems limit the ability to provide for upgrades and modifications and render repairs expensive.

Many accidents could have been avoided if the mariners were equipped with a 3 dimensional, forward-looking, bottom mapping and obstacle detection sonar with a fixed frame of reference for navigation. To be navigationally effective, the sonar must have a fast update rate. Depending on their size and sea conditions, ships can tilt and roll so much that the depths of obstacles including the seafloor detected with a phased array sonar can be tens of meters in error. Therefore, not only is advantageous to generate the 3 dimensional image with a single or small number of pings, it is also advantageous to display the image with a fixed frame of reference.

SUMMARY OF THE INVENTION

A forward looking (side looking, or bottom looking) sonar system has the following features. A transmit transducer projects a signal into the water ahead of the vessel. A phased array of receiving sensors provides signals to a computer which determines the azimuthal and elevation angles of arrival and time of arrival. This sonar is equipped with tilt and roll sensors and may be interfaced with GPS and a compass. The acoustic information along with the tilt and roll can be processed to create a 3-D image ahead of the vessel with a fixed frame of reference relative to the earth from the raw beamformed data. This is necessary in understanding the picture ahead of the vessel. By including heading and GPS sensors and information the images can be fixed to a specific location on the earth. This is necessary many displays such as historical mapping and chart overlay. Advanced signal processing techniques enable the processor to extract targets from the raw beamformed data. Additional features of the system enable the suppression of many multipath targets.

DETAILED DESCRIPTION OF THE INVENTION

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
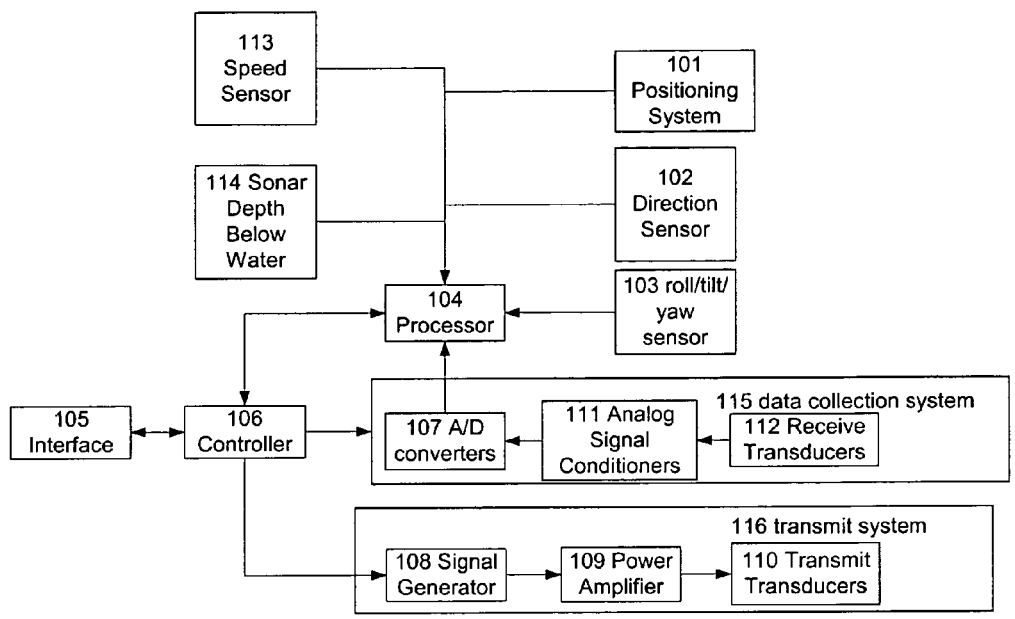
FIG. 1 is a block diagram of the sonar system.

A block diagram of the preferred embodiment of a forward looking sonar is shown in FIG. 1. A forward looking (side looking, or bottom looking) sonar system has the following features. Referring to FIG. 1, a transmit transducer 110 projects a signal into the water ahead of the vessel. A phased array of receiving sensors 112 provides signals to a computer which determines the azimuthal and elevation angles of arrival and time of arrival. This sonar is equipped with tilt and roll sensors 103 and may be interfaced with GPS 101 and a compass 102. The acoustic information along with the tilt and roll can be processed to create a 3-D image ahead of the vessel with a fixed frame of reference relative to the earth. This is necessary in understanding the picture ahead of the vessel. By including heading and GPS sensors and information the images can be fixed to a specific location on the earth. This is necessary many displays such as historical mapping and chart overlay.

Depending on their size and sea conditions, ships can tilt and roll so much that the depths of obstacles including the seafloor detected on a phased array sonar can be tens of meters in error. The fixed frame of reference 3-D sonar allows the mariner to observe potential obstacles in the context the volume of water ahead of their ship relative to the sea surface and/or the sea floor.

Fixed frame of reference means that the sonar data is plotted relative to a stationary body which allows the user to better understand the image. In the preferred embodiment, the fixed frame of reference is the center of the earth. As an example, it is preferred that the sea floor is always stationary in the sonar system's display.

A positioning system such as Global Positioning System (GPS) or Loran is used to collect location information. This location information is used in conjunction with direction information to position the sonar data relative to a geographical location on earth. This geographical relationship is needed for best results in applications that require geo-referencing such as overlaying the sonar data on a nautical chart, creating cartographical maps, building historical data charts, ping to ping correlation, sonar routing archiving and replaying, and other GIS based data collection. Once a geo-referenced sonar image is made, positioning information can be used to update the position of the vessel graphic in the sonar data display relative to the position of the sonar data. This component of the system is optional.

Additionally, processing a 3 dimensional image enable other advantages such as removing multipath targets from above the sea surface, behind walls and below the sea floor.

Referring to FIG. 1, the preferred embodiment of the invention includes a direction sensor 102. The direction information may be derived from GPS, a compass, dead reckoning, or other standard navigation technique. Direction information is needed for best results in applications that require geo-referencing such as overlaying the sonar data on a nautical chart, creating cartographical maps, building historical data charts, ping to ping correlation, sonar route archiving and replaying, and other GIS based data collection. This component of the system is optional. An optional yaw sensor may be included in correcting the direction information from the direction sensor.

Overlaying geo-referenced sonar information on other types of geo-referenced data such as nautical chart data, as described in U.S. patent application Ser. No. 10/177,889 which was filed on Oct. 22, 2002, and is hereby incorporated by reference as fully set forth in is entirety herein, is optionally part of the preferred embodiment of the invention. In this embodiment, the sonar data is drawn on top of other information. Additionally, other geo-referenced information may also be drawn on top of the sonar data. The information may be displayed to the user in the form of multiple image layers such as is common in many CAD programs. The sonar layers may be shown as 3 dimensional surfaces, 2 dimensional projections of the 3 dimensional information, icons representing features in the sonar data, other representations as described in U.S. patent application Ser. No. 10/177,889, or in any combination of the above with any number of filters set to display any sub-set of the data herein. The entire, multi-layer, geo-referenced scene may be displayed in 3 dimensional perspective view or in plan view. The details of which do not need to be discussed as they are well known in the art of multi-layer display systems.

Cartographical maps can be made from a series of 3 dimensional forward-looking (or side looking, or downward looking) images. In this embodiment, the geo-referenced sonar data is combined onto one image. In placed where pings overlap, the data may be averaged, filtered, reprocessed for multi-ping correlation, or selected by any number of selection criteria such as age or data, range of data from sonar system, angle or data relative to sonar system, signal strength, target strength, vessel stability, transmission signal type used, or any other type of tiling techniques known in the art of image processing.

In another embodiment, ping to ping correlation may be performed by comparing multiple pings covering overlapping areas. The correlation may utilize feature tracking, multi-look/snapshot processing, averaging, synthetic aperture processing, or other signal processing techniques to improve accuracy, improve resolution, track targets, measure target properties such as speed, collision detection, time to collision, and course, and other oceanographic and acoustic values. Examples of other oceanographic and acoustic values include calculating sound speed profiles and calculating vessel characteristics such as speed and heading.

In another embodiment, route archiving and replaying may be performed with geo-referenced sonar data. In this embodiment, geo-referenced data is saved and can then be replayed in a time series overlaid on top of other geo-referenced data. Non geo-referenced sonar data can also be saved for playback on array face referenced displays.

In another embodiment, historical data charts can be built for any geo-referenced location using a series of geo-referenced sonar images of for the same location. By imaging the same area over time, a time dependant image of the area and/or a time dependant measurement of the depth can be built. Historical data charts may be useful in survey and homeland defense applications.

In another embodiment, vessel direction information combined with a speed sensor can also be used to update the position of the vessel graphic in the sonar data display relative to the position of the sonar data. This allows the position of the vessel to be noted as it changes over time relative to the location of the sonar data collected on any ping or series of pings. This allows for a more complete picture of a vessels relative location to features in the environment between updates of the sonar image. This technique can also be used to show the vessel's actual position relative to the sonar information in realtime even if there is a known delay between the sonar data generation and the display to the user. The speed information may be derived from any standard navigational technique. This component of the system is optional.

Figure 2:
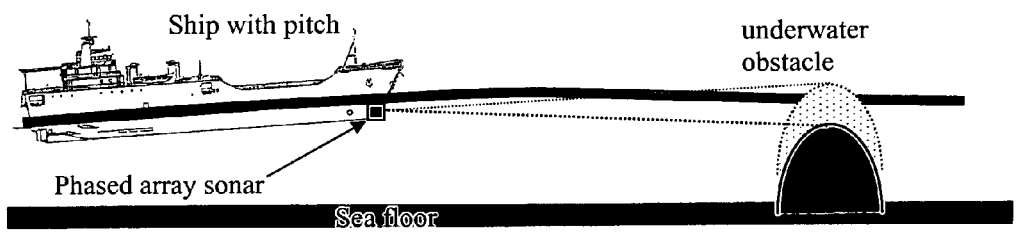
FIG. 2 is an example of fixed frame of reference where underwater obstacle is shown relative to the earth and the depth estimate without pitch sensor.

Roll and tilt information for the receive array face relative to the earth is required for 3D imaging with a fixed frame of reference. This information can be combined with acoustic data to create a 3D image with fixed frame of reference for navigation through signal processing as described in U.S. patent application Ser. No. 10/177,889. During processing, the beamformed data which by definition is spatially referenced to the array face is rotated using standard coordinate space rotation techniques such as matrix rotations often used in digital imaging. In the preferred embodiment, the rotation is performed along both the vertical (elevation) and horizontal (azimuthal) axes. The amount of rotation is determined by a roll and tilt sensor. The roll and tilt sensor may be based on initial measurements, electromechanical sensors, accelerometers, or any other sensor that is able to generate roll and tilt information relative to the earth. Optionally, this sensor may include yaw measurements. The update rate of the positioning system, the direction sensor, the roll/tilt/yaw sensor, and the speed sensor affects the precision of the positioning of the sonar data relative to a fixed frame of reference and geo-referenced location. Without roll and tilt compensation, targets are placed incorrectly relative to the earth as illustrated in FIG. 2. Targets must be placed correctly for use in navigation.

Referring to FIG. 1, the processor 104 takes all of the incoming data. It beamforms the acoustic data and creates 3D image relative to the array face. It then takes that image and uses the additional data sources to position the sonar data relative to a fixed frame of reference. For example, if the fixed frame of reference is the earth, the data is first related to the angular position of the earth but relative to the vessel through roll, tilt, and, optionally, yaw sensors. The position of the stabilized image is then geo-referenced to the earth's position by referencing the vessel's position to the earth and then to the sonar system. Commonly, the vessel is referenced to the earth through GPS, dead reckoning, Loran, long-base-line, short-base-line or triangulation although, any means of referencing the vessel's bearing and geographical position is acceptable.

The processor receives the acoustic data from the data collection system 115. The data collection system consists of an array of transducers 112 used for receiving incoming acoustic signals, analog conditioning electronics 111, and an analog to digital converter 107.

All or some of the receive transducers 112 may be used as all or part of the transmit array 110 by means of a Transmit/Receive switch commonly called a T/R switch. This array must be 2 dimensional and can be a fully or sparsely populated planar or conformal array. In the preferred embodiment, the elements in the array should be spaced at no more than one half the wavelength of the center frequency of the transmitted and expected receive signals to ensure that all grating lobes are kept out of real space. Great than half-wavelength spacing may be used to create larger array apertures for a given number of channels as long as the field-of-view is reduced to keep grating lobes out of the beamformed data. In other embodiments, other element spacing schemes such as logarithmic spacing may be used. In the preferred embodiment, many more than 10 elements/channels are needed though the same techniques described by these embodiments can also be used by any array with fewer channels realizing that smaller channel counts may not yield high enough resolution systems for most applications. Multiple channels are needed in order to beamform in 2 dimensions. The number of channels may range from 10s to 100s to 1000s of channels. Better performance is generally achieved with more channels.

In the preferred embodiment, the analog signal conditioning electronics 111 include a pre-amp, a high-pass filter, a band-pass filter, and gain for each receive element or channel. Optionally, the gain stages may be time variable and over voltage circuit protection may be included. Time variable gain is one way of increasing the dynamic range of the system. Optionally, a demodulator stage may also be included in analog signal conditioning electronics. In may be preferred to use electronic design techniques which minimize the electronics noise generated by the system.

The analog to digital converter 107 in the preferred embodiment digitizes the analog signals and outputs the complex number representation components of a signal called "In-phase" and "Quadrature" known as I and Q in signal processing. Should, the analog converter only produce real output values, the I and Q can be derived from the real signal by means of standard signal processing techniques. In the preferred embodiment, each channel of acoustic data should be synchronized with the other channels to be collected at the same rate and at the same time as all the other channels. Should there be a time delay between subsequent channels or banks of channels, known as multiplexer skew, the signals can be skew corrected for phase comparison processing by standard signal processing techniques.

In the preferred embodiment, bandpass sampling techniques are used. Bandpass sampling reduces data to encompass just the bandwidth needed to cover transmit signal plus Doppler shifts. If full bandwidth or over sampling techniques are used, it is preferred to digitally filter and reduce the collected data using known digital filtering techniques such as comb filtering. The reduction of data though bandpass sampling or digital filtering techniques reduces the amount of processing throughput without loss of information. For high frequency systems, analog signal demodulation may be used before digitization to reduce sampling speed requirements.

The transmit system 116 is the component of the system that generates the transmitted signal known as a ping. In the preferred embodiment, it includes the signal generator 108, the power amplifier 109 and the transducers used for transmission 110. The signal generator 108 produces the signal to be transmitted though the water. In the preferred embodiment, the transmit signal is of finite bandwidth such as a CW pulse or frequency modulated signal commonly known as a chirp. Additionally, the transmit signal can be phase encoded or use other common signal encoding techniques such as Gold Codes and orthogonal coding to distinctly separate multiple pings from one another when used in conjunction with the appropriate matched filter. The multiple pings to be separated may be generated by the same sonar system or by multiple sonar systems located near each other. In addition to or in place of signal encoding, each ping may be confined to a particular and distinct frequency band or group of bands which are separate and distinct from other pings to allow for ping separation. In the preferred embodiment, the signal generator is capable of producing a number of different signals, varying in duration, frequency sweep, center frequency, encoding technique or other common signal characteristics.

The power amplifier 109 amplifies the transmit signal to a power level suitable for transmission through a transmitter 110. The transmitter may be a single transducer or an array of transducers. Part or all of the transmitter may operate as part or all of the receiver by using transmit receive switching commonly known as TR switches. The transmitter may be planar, spherical, hemispherical, conformal or other common shape in form.

Figure 3:
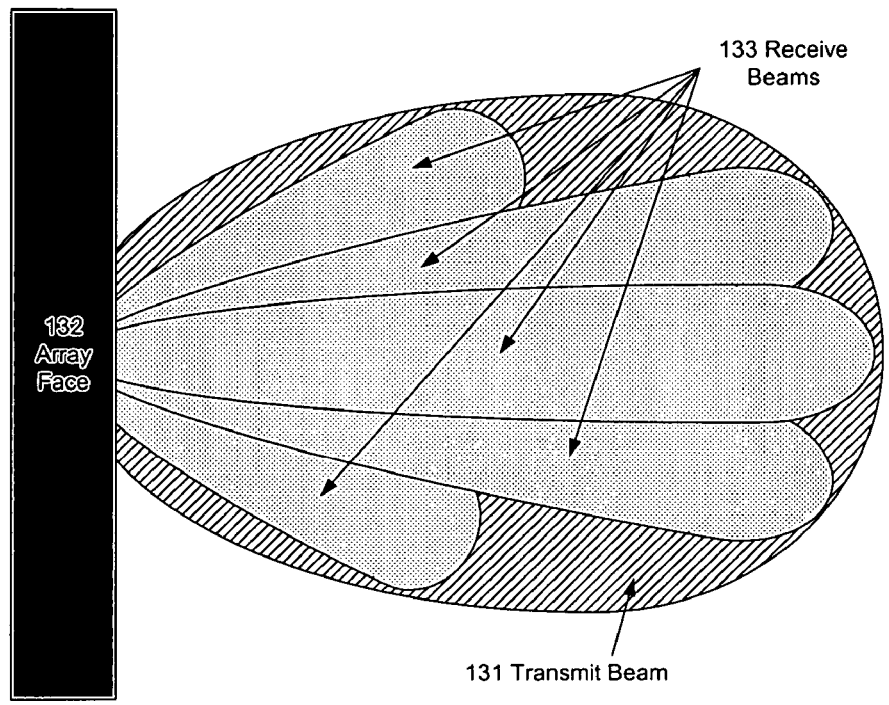
FIG. 3 is an illustration of the beampatterns and beam steer angles of a broad beam transmitter and a narrow beam receiver.

Referring to FIG. 3, in the preferred embodiment, the sonar system uses a broad beam transmitter with a narrow beam receiver 130. In this embodiment a large field-of-view is built with a single ping. The transmit beam 131 is used to ensonify a large volume of water. Multiple receive elements located in the array face 132 are used to create narrow receive beams 133 which can be steered electronically using beamforming techniques.

Again referring to FIG. 1, in the preferred embodiment, a controller 106 is used to synchronize the operation of each of the subsystems in the sonar system. The controller may be collocated with any of the subsystems or operate on an independent platform. Communication between the controller and any of the subsystems may be through any convenient digital communications method available such as Ethernet, bus level communications, IEE1394, USB, etc. In some cases, the data collection system 115 may include all or part of the controller. In these cases, the data collection system will only interact with the processor 104 indirectly though the communications system established by the controller 106. In the preferred embodiment, the controller has the capability to connect to more than one interface 105 and/or more than one processor.

Figure 4A:
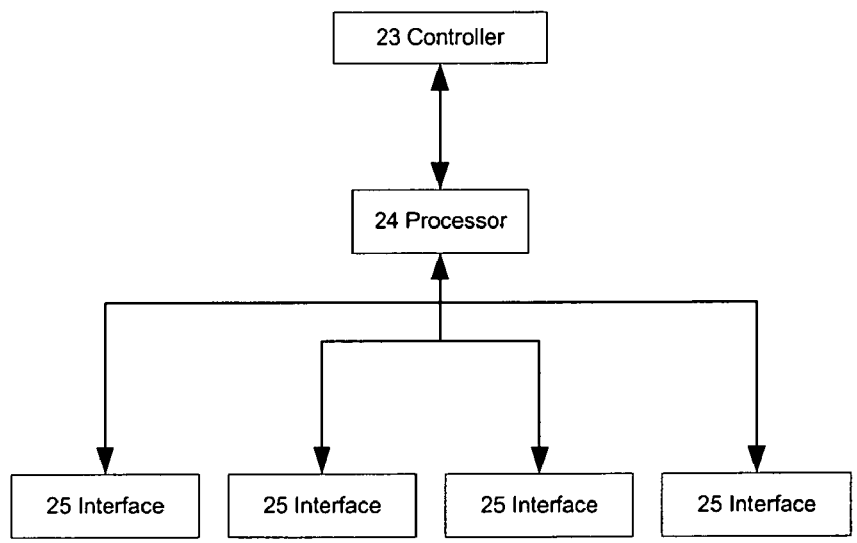
FIG. 4a is an example block diagram of a system architecture with one processor and multiple interfaces.
Figure 4B:
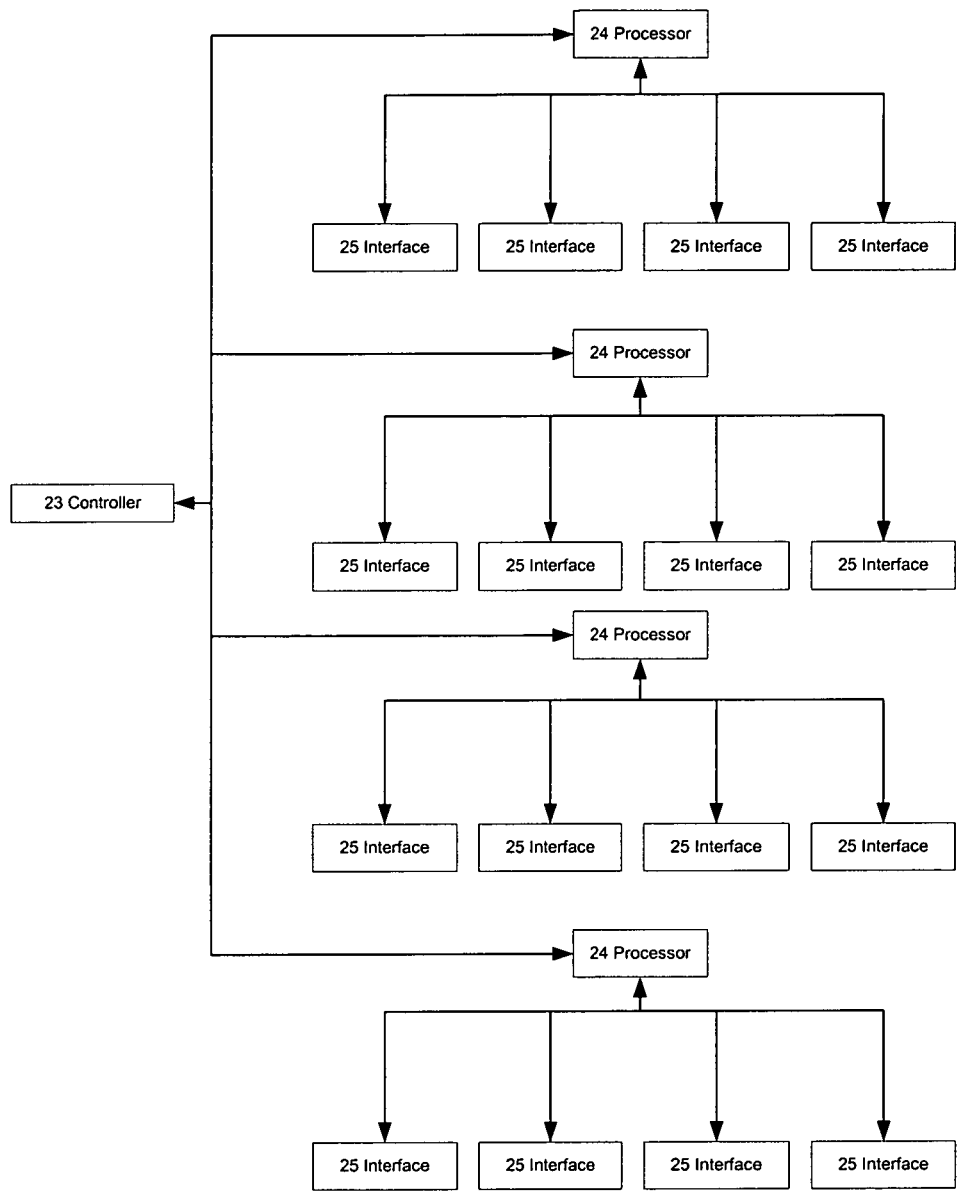
FIG. 4b is an example block diagram of a system architecture with multiple processors and multiple interfaces.

Referring to FIG. 4a, the sonar system may have a single processor 24 which sends information to any number of interfaces 205 which may or may not be collocated with the processor. Referring to FIG. 4b, the sonar system may optionally have multiple processors each sending information to one or more interfaces.

In the preferred embodiment, the interface or interfaces 25 can be human user display interfaces, human user audio interfaces, machine interfaces, or any such combination of the such. Human user interfaces include but are not limited to 2D image displays, 3D volumetric displays, 3D rendered stereoscopic displays, heads-up displays, lighted alarms, audible alarms, and audible navigation suggestions. Machine interfaces include but are not limited to digital communication such as Ethernet or serial connection to navigation hardware and software API for programming interface. In one embodiment, the interface may provide course suggestions to a navigation controller aboard an unmanned vehicle or an autopilot steering system.

Again referring to FIG. 1, the processor 104 takes digitized sonar data from the data collection system 115 as its primary input. From the sonar data, the processor is able to beamform and produce a data output of space ahead of the vessel relative to the array face. In the preferred embodiment, the processor also takes as inputs roll, tilt and yaw 103, direction information 102, position data 101, vessel speed information 113 and sonar depth below water surface information 114 from appropriate sensors. The processor in the preferred embodiment takes all or part of the information from these ancillary sensors and creates a 3D image ahead of the vessel with a fixed frame of reference relative to the Earth and optionally relative to a fixed position on the Earth.

Figure 5:
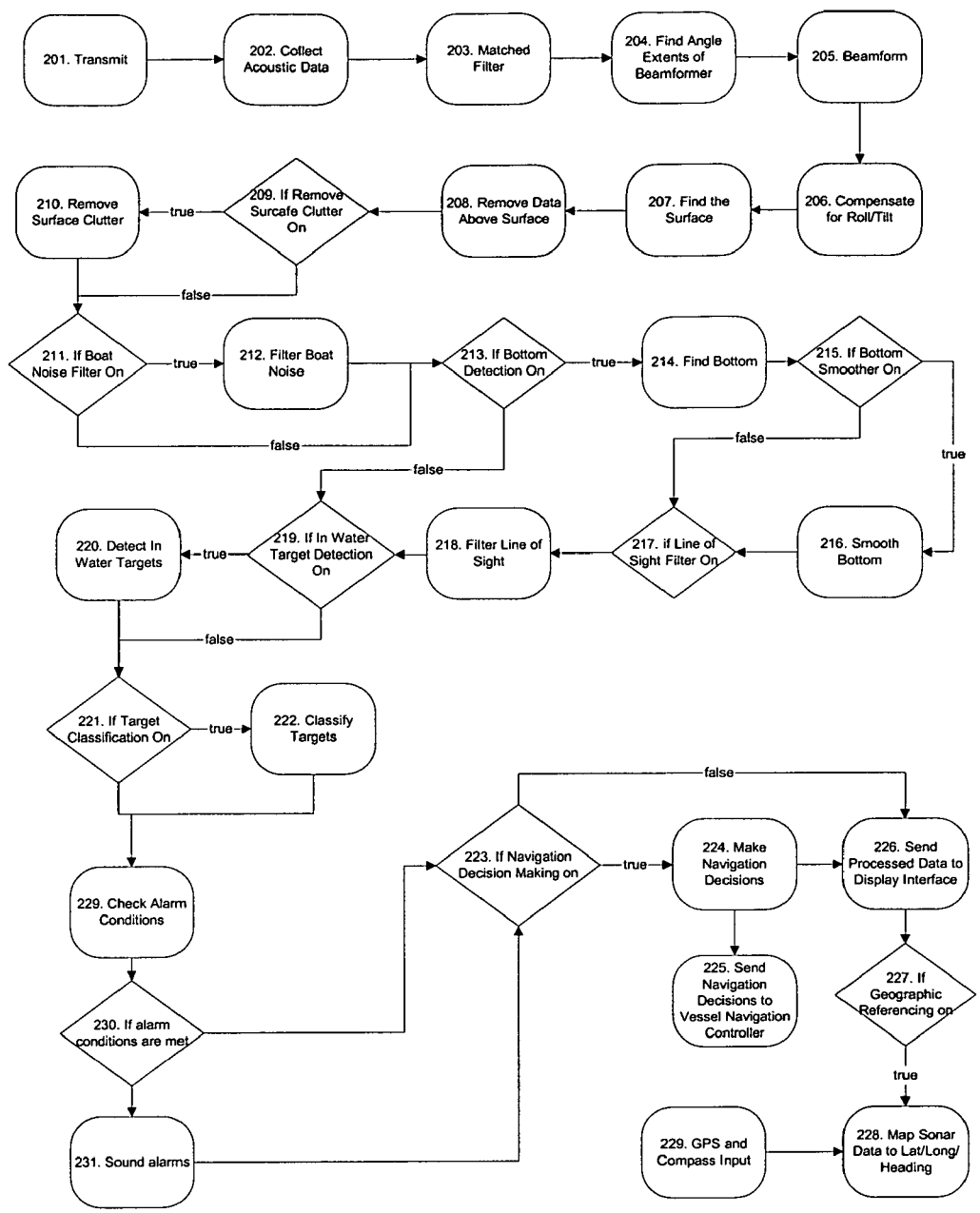
FIG. 5 is a flow chart of the target detection, display, and interface process.

The flow chart in FIG. 5 outlines the process used to extract target data from the acoustic data and in conjunction with outside sensors mapping the targets to a fixed frame of reference. In the preferred embodiment, target detection is initially done through correlation of signal strength detections within a set of beamformed data. More advanced target detection routines may include classification routines using spectral analysis or other common classification techniques.

Figure 6:
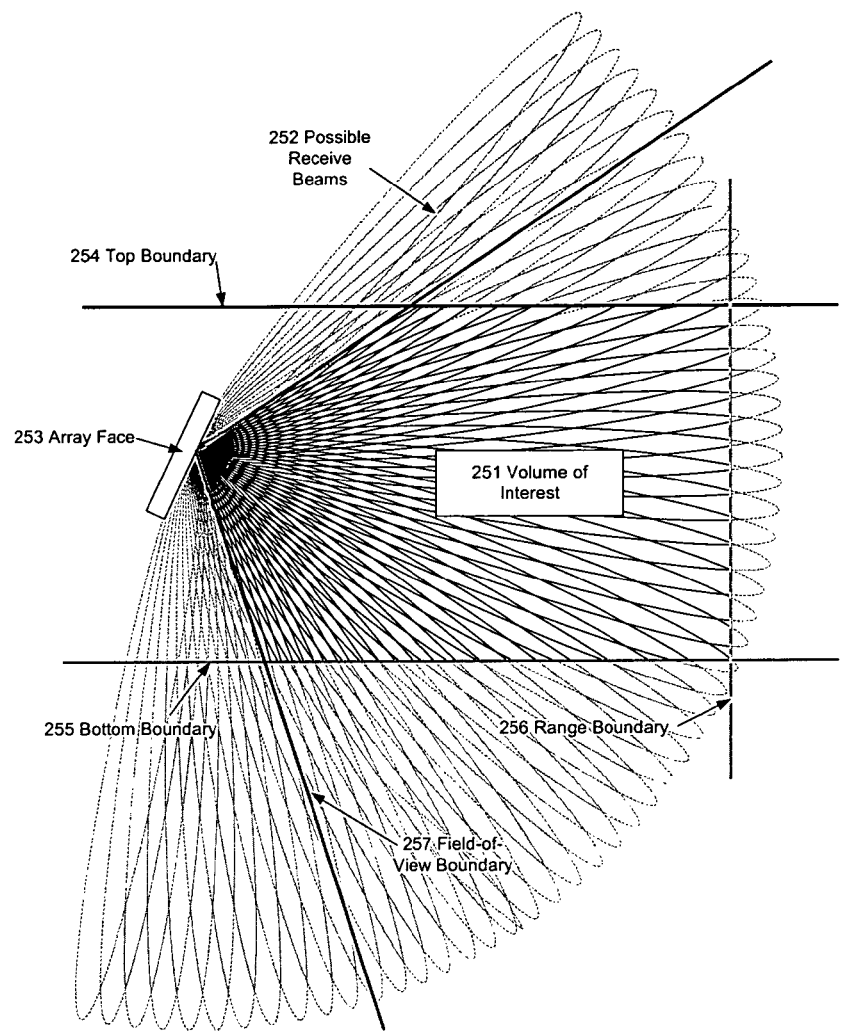
FIG. 6 illustrates the spatial selection of receive beam to include a given volume of interest.

The process begins with a ping transmission 201. The acoustic reflection signals are collected using a 2D array of transducers and a data collection system 202. Each hydrophone data channel passes through a matched filter 203 which removes noise from the acoustic data. The next step is to select the angles to be used in beamforming 204. These angles may be pre-selected as configured in the software or as selected by the user or controller. In the preferred embodiment, a large range of angles, greater than the normal field of view, are pre-selected by the software. The software then determines which angles and to what ranges to actually use so as to only process those angles and ranges that are within the field of view used by the system. These angles may change from ping to ping based on the motion of the ship relative to the water and are illustrated in FIG. 6. In the most basic selection of angles to be used in beamforming some range may be statically selected in the processing routine and all samples out to some maximum radial range may be used.

FIG. 6 shows possible receive beams and their angle relations relative to the array face 253. Data processing load can be reduced by bounding the volume of interest 251 by a top boundary 254, a bottom boundary 255, a field-of-view boundary 257 and a range boundary 256. These boundaries may be defined based on physical objects such as the sea surface or programmatically defined maximums. For example, the top boundary may be defined by the sea surface. Since the sonar does not work across the fluid boundary layer between the water and the air, there can be no data of interest above the sea surface and therefore, there processing can be saved by truncating the range of processing along any beam that crosses the top boundary at the beam's respective range at the top boundary. In the preferred embodiment, beam angles that fall outside of the boundaries and the ranges along beams that fall outside of the boundaries can be skipped to reduce processing load.

The next step in processing the data is beamforming 205. Beamforming of any nature may be used to transpose the data from the time domain to the space domain along reference angles. Common beamformers include FFT and DFT based beamformers. By using a DTFT instead of an FFT or DFT for beamforming, the subset of angles can be selected differently for different ranges allowing, for example, a smaller subset of angles to be processed at longer ranges than those processed at shorter ranges.

Because of sensitivity to Doppler shifts, beamforming without Doppler compensation may not detect all targets at all ranges and angles relative to the array face. To compensate for Doppler shifts, a signal phase change can be injected into the beamformed data where the phase change is a function of Doppler shift. The platform's speed can be used to calculate Doppler shift at any beamformed angle relative to the array face. In the preferred embodiment, a Doppler correction filter can be applied to each beamformed angle. An alternative method is to apply the Doppler correction filter to the raw hydrophone data before beamforming. By applying the Doppler correction to the raw hydrophone data less processing may be required for systems which have fewer hydrophone channels than beamformed beams. The consequence of correcting Doppler before beamforming is that at high platform speeds, large beamformed angles provide large yet regular variations in the Doppler shift. Simply correcting for a single amount of Doppler shift before beamforming may improve target detection results as compared to no Doppler correction, however is not always as effective as using a more computationally intensive method of correcting for Doppler after the beamforming. In the preferred embodiment, it may be preferred to correct for a number of Doppler shift variations based on the platform's speed before beamforming and beamform each set of Doppler corrected data individually. This process will allow for a larger range of corrections and in many cases will yield better results than simply correcting for one Doppler shift yet requires less computation than correcting every beamformed angle.

After beamforming, target data is spatially referenced relative to the array face. Compensating for the roll and tilt of the array face 206 is used in the preferred embodiment to reference the special target data to a fixed frame of reference relative to the earth. In the preferred embodiment, roll and tilt sensors with a fixed orientation relative to the array face are used to measure correlate the roll and tilt of the array face relative to the earth. This not only stabilizes the target data in spatial position from ping to ping but also references the data to the earth. Target stabilization without fixed frame of reference can be achieved through ping to ping correlation where the relative location of a tracked target is compared from ping to ping and used to extract the change in roll and tilt of the array face. This technique, however, does not allow for direct relation between the target data and the earth for fix frame of reference display and processing.

After relating the target data to a fixed frame of reference, all processing points that are mapped above the surface of the water can be removed from the beamformed data before submitting the beamformed data to target extraction algorithms. First the surface must be found. In the preferred embodiment, the surface location 207 can be calculated by taking the depth below the surface information for the array face and mapping the target space location to a fixed frame of reference relative to the surface of the water. Array face depth information may be directly inputted into the processor from physical measurements or can be calculated from various depth sensor techniques. Additionally, the surface may be extracted from the beamformed data through frequency analysis or other classification routines used to identify targets as the air water surface boundary. All beamformed data spatially referenced above the located surface can be removed from future processing routines 208.

In the preferred embodiment of the sonar technology, it may be useful to remove surface clutter from the displayed data or data to be processed further for inwater target or seafloor detection. Surface clutter may be caused by wave action, bubble fields near the sea surface, large numbers of small floating object or other such debris. This capability is optional and may be selectable if included in the processor's routines 209.

Figure 7:
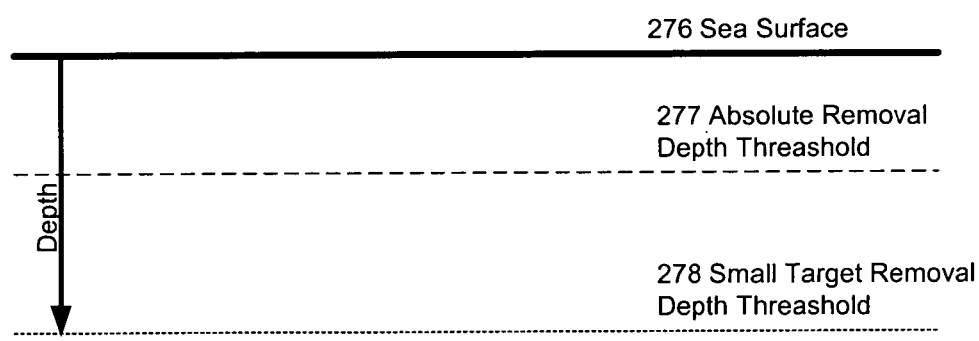
FIG. 7 illustrates depth thresholds for surface clutter removal.

Rough seas and/or surface clutter can be removed from the sonar display and processing by a number of techniques/conditions, all of which can be combined together a illustrated in FIG. 7. These conditions include: remove targets above some certain depth, remove targets below some certain target strength, remove targets below some certain signal level, remove targets within some certain range, and remove targets with a given spectral quality. These values and conditions could be set automatically, or set by the user.

In the preferred embodiment, all targets above a certain depth threshold 277 are removed from the display and further processing. Additionally, all targets above a certain depth 278 have a higher target size threshold for detection than other generally detected targets. Either one or both of these filters may be used to remove surface clutter. Additionally, signal classification may be used to only pass classified targets to the display or further processing routines.

Referring again to FIG. 5, another source of noise and false targets can be the vessel or platform that the sonar is mounted on itself. In some installations, the deployment platform may interfere with the sonar system's field of view. In these cases it may be preferred to have the option of removing platform reflections from the data set to be processed or displayed 211. Additionally, large targets in the sonar's near-field such as the boat or other large objects, may cause the raw hydrophone signals to saturate the analog electronics and clip the signal. Clipped signals generally do not process well and should be in the preferred embodiment removed from the data set.

Figure 8:
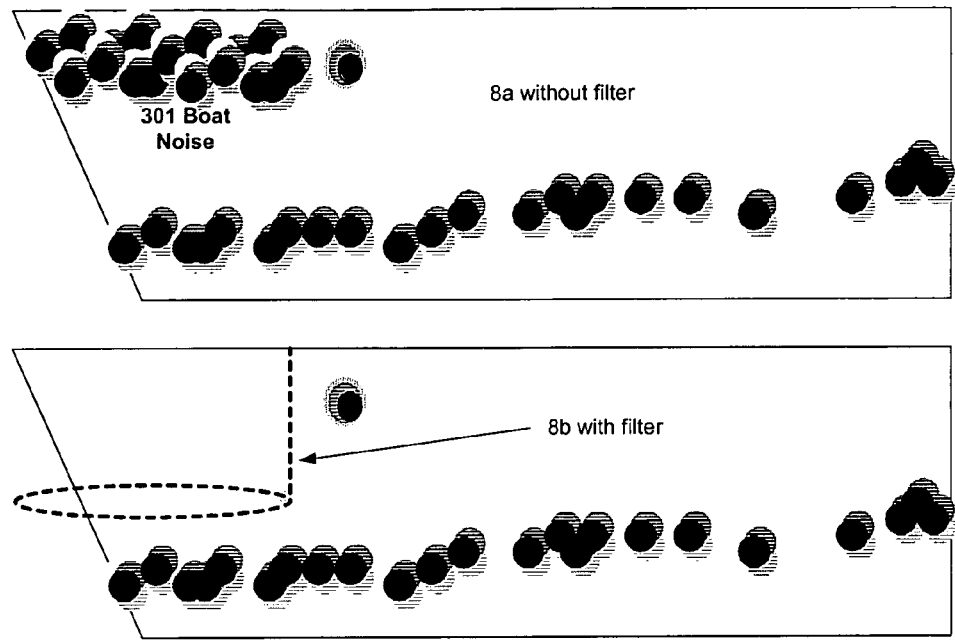
FIG. 8 illustrates a two dimensional vertical slice through beamformed data with and without a boat noise removal filter.

Both boat noise and near-field large targets can be removed from the data with a spatial filter 212. All signals within the spatial filter can be ignored in processing and the display. This spatial filter may be made up of a single or multiple boundaries based on any 3D volume. A simple example of a spatial filter is a cylinder shape with the axis vertically passing through the sonar's array face as illustrated in FIG. 8. FIG. 8a shows a vertical slice through a 3D beamformed data with signals from platform reflections 301. After removing targets from the volume filtered using the platform noise removal filter, the platform noise is removed as shown in FIG. 8b. Advanced filtering techniques may include frequency filters and classification techniques to remove only specific targets from the filter volume. Platform noise removal filters are optional.

Referring again to FIG. 5, after the boat noise removal filter, sea floor detection may be optionally processed. If bottom detection is enabled 213, bottom points are identified within the beamformed data after filtering 214. In the preferred embodiment, the bottom is initially found in the beamformed data by searching for the largest absolute signal strength return at any given depth for every range and bearing combination. All returns from this array of signal peaks over some user defined or software defined threshold are determined to be potentially part of the sea bottom. From the array of potential bottom points, any random outliers are removed. These outliers are points that do not follow the regular pattern of the bottom. Outlier identification techniques may include common image processing techniques or other such pattern recognition techniques. These techniques may include removing points whose depth, down range, or cross range spatial location values do not follow a trend. The bottom detection routine may include target classification where points that can be identified as bottom materials are selected as potential bottom points using spectral or other such signal classification techniques.

Once the bottom is detected, it may be optionally smoothed 215. Bottom smoothing is accomplished by passing the potential bottom data though a moving, weighted average filter 216. The average may be weighted based upon target strength, signal strength, and/or other such bottom classification parameters. The values to be averaged are spatial location data including depth, cross range, and down range.

Figure 9:
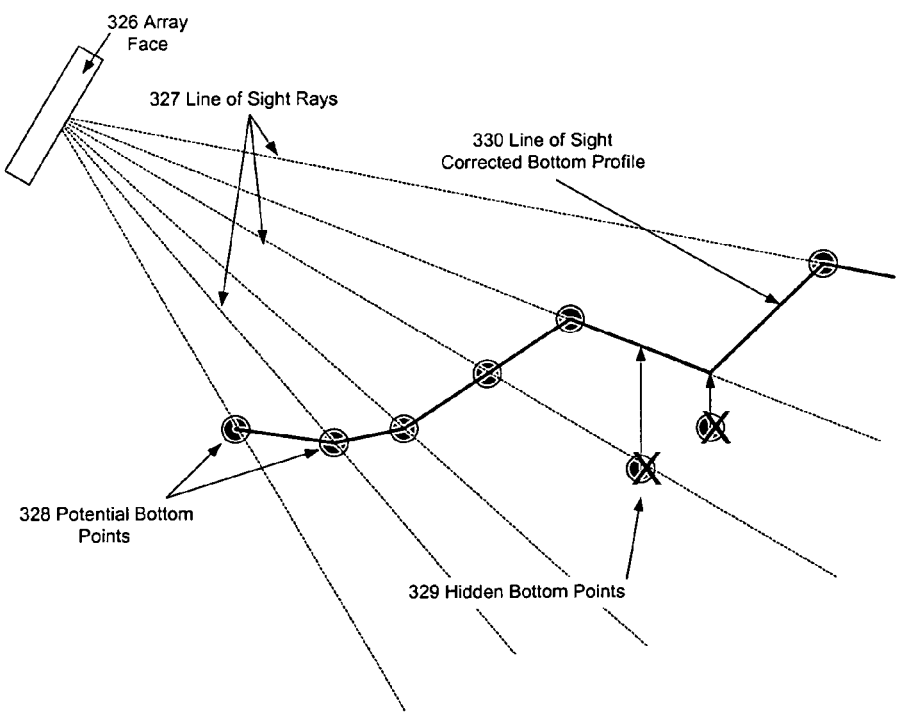
FIG. 9 illustrates the use of a line of sight correction filter along a 2D depth profile.

When extracting the bottom surface from the raw data, the bottom may be pitted. Some of these pits are caused by constructive and destructive interference in the reflected signals due to sea floor variations. In an effort to display the data in a clearer format to the user, a line of sight filter may be optionally used to produce a more realistic view of the data 217. Because this sonar technology is based on line of sight processing, realistic bottom depths cannot be measured for points that are hidden behind other targets or structures. In the preferred embodiment, a line of sight filter is used to remove depths points that are hidden from the direct line of sight of the array face due to other objects 218. In this filter, a ray from the array face through each bottom target is calculated. Any bottom targets that fall below the depth of the ray at and range beyond the original target are replaced with the spatial location information of the ray's point at the range and bearing of the hidden target point. As example, in FIG. 9, potential bottom points 328 along a 2D vertical slice are shown relative to the array face 326. Line of sight rays 327 are shown from the array face intersecting each of the potential bottom points. From the rays, it is shown that there are a number of hidden bottom points 329 that could not be seen by the sonar but are still selected as potential bottom points. The depth, cross range, and down range values for these hidden points are changed to the depth, cross range, and down range values of the corresponding range along the line of sight ray. With the corrected points, a line of sight corrected bottom profile can be made 330.

Figure 10A:
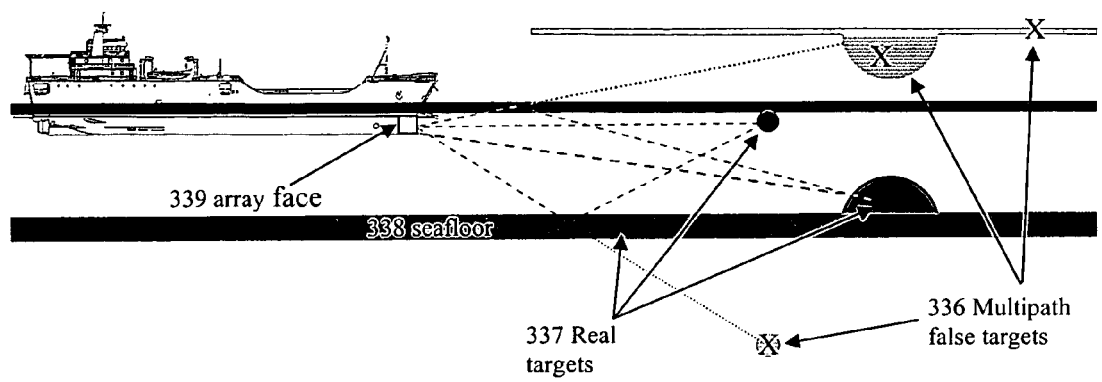
FIG. 10a illustrates the elimination of false targets due to multipath reflections through the integration of vertical resolution.
Figure 10B:
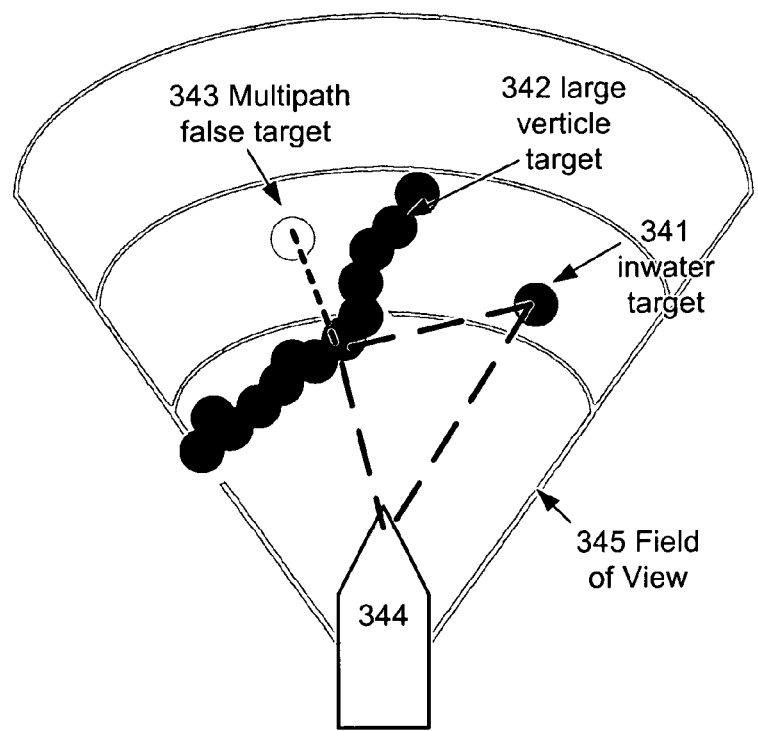
FIG. 10b illustrates the elimination of false targets due to multipath reflections through the integration of horizontal resolution.

In the preferred embodiment, the line of sight filter can be used in the both the vertical and the horizontal to remove target ambiguities caused by multipath as illustrated in FIGS. 10a and 10b. By approaching the sonar problem from a navigation point of view, issues pertaining to multipath, which normally limit the performance of many sonar technologies, are eliminated once multiple dimensions are processed simultaneously. Given a known location of the sea floor 338 and the sea surface, all multipath false targets 336 in the vertical can be eliminated because they fall either above the surface or below the sea floor as shown in FIG. 10a. Bottom target extraction routines can be used to detect the sea floor. Additionally, the surface location is known from depth sensors or user defined depth placement of the array face 339 combined with roll/tilt detection electronics. When the system does not operate in a sub-bottom mode, ambiguities can be eliminated. This solution is only appropriate for a 3D image ahead of vessel with fixed frame of reference for navigation.

This same concept can be implemented in the horizontal since the technology is a line of sight system and we do not process targets that are behind other targets. An example of when multipath may become an issue in the horizontal is when a large in water target like a vessel 341 is near a large vertical reflector like a bulkhead 342 such as illustrated in FIG. 10b. In this case, both sets of targets fall with in the filed of view 345 of the sonar system located aboard a ship 344 and therefore, multipath images of the target vessel may be reflected by the bulkhead creating false targets 343.

Referring again to FIG. 5, in the preferred embodiment, in-water targets may optionally be extracted from the beamformed data and displayed with or without bottom mapping in conjunction or exclusively from sea bottom targets 219. In-water targets can be initially found by finding local peaks in the absolute signal strength data. Any local peak that is not part of the sea bottom data and has not been filtered out through previous filtering techniques and are above a certain signal strength threshold can be considered an in-water target 220.

In the preferred embodiment, these in-water targets can be displayed as voxels or other images in 2D and 3D representations. The size of the displayed object may be a function of target strength or a function of the beamwidth of the target at the detected range. The color and alpha blending of the displayed objects may be mapped to depth and/or signal strength. Additionally, icons may be used to represent common targets or target groups. Representations of the inwater targets may be displayed independently of any bottom maps and may be exported to other navigation, classification, tracking, or control devices independently from the bottom map data. In the interface software, the user may in the preferred embodiment have the ability to select particular targets or target groups with a mouse or other pointing device. Once selected, the display interface may have the ability to display additional information about the target such as target strength, signal strength, range to target, bearing to target, depth of target, speed of target, relative speed of target, time to collision, etc. These advanced display capabilities are optional. In the preferred embodiment, the user may have the option to classify some or all of the targets 221. Target classification may be using a number of classification techniques such as frequency analysis, matched filtering, image processing, wavelet technology, neural network technology, passive listening, or other signal classification routines 222. Target classification may be used to filter out unwanted targets from the display or other processing routines.

After extracting targets from beamformed data, the preferred embodiment has the option of testing various alarm conditions 229. Multiple user definable and system defined alarms may be present which may alert the user or other navigation, classification, tracking, or control devices or alert conditions. Multiple alarm conditions can be tied together. These alert conditions may include but are not limited to the notification of a depth less than some minimum depth, the notification of a depth greater than some maximum depth condition, the notification of a target within some minimum range, the notification of a target within some cross range or bearing range from the vessel's path or some definable bearing, the notification of what the minimum depth is along some heading or within some area, the notification of a target along a collision course, the notification of a target that is persistent from more than one ping, the notification of a particular type of target, the notification of target within specified field of view, the notification of bottom detected, the notification of no targets present, the notification of a moving target, the notification of a stationary target, and/or the notification of targets beyond some range.

If any of the alarm conditions are met, the alarm should be sounded 231. In the preferred embodiment, the alarm can be sounded by audible and/or visual alarms in the user interface display and/or stand alone alarm consoles. Additionally, alarm notifications can be sent via electronic communication methods such as serial or Ethernet communication to other system interfaces such as autopilots, voyage logs, and other control systems.

Once targets are located, in the preferred embodiment, the system may optionally provide navigation recommendations 223. By analyzing the localized targets using common image processing, neural networks, or other signal processing techniques, the system is able to identify obstacles to navigation and make recommendations to user or other navigation or control systems regarding navigation decisions. These decisions may include but are not limited to turn left, turn right, slow down, speed up, stop, reverse direction, dive, climb, sound a horn, ring a bell, and/or transmit a call via radio or other electronic communication device 224. These decisions can be displayed to the user via graphics, transmitted to the user with audio signals, or sent to a navigation or control system via common electronic communication methods 225.

In the preferred embodiment, after processing all the data with various stages of filtering, alarms, and conditions, the processed data is then sent to the display interface for user interaction 226. In the preferred embodiment, the display has the option of utilizing geo-referencing to create a sonar image referenced not only to a fixed frame of reference but also a fixed location on earth 227. If this option is enabled and geo-location reference sensor data is available such as GPS, loran, and/or compass information 229, the sonar data can be mapped to it earth location relative to the earth and relative to the vessel 228. In the preferred embodiment, once sonar data is geo-referenced to the earth, historical data can be displayed it its geo-referenced earth position relative to the position of other pings. These displays can include historical depth profiles at previous vessel positions and adjusting the position of the vessel graphic relative to a fixed geo-referenced location or the sonar data on the sonar data display. The movement of the vessel depicts the actual location of the vessel relative to the sonar targets as the vessel moves between pings. Should geo-positioning data not be available, historical data can be displayed with incremental spacing as a function of time passed or continually referenced to the vessel. Optionally, brightness, targets size, target color, and/or alpha blending properties of a displayed target can be used to depict the time history of the historical data. One example would be the persistence of older sonar data on top of newer sonar data with the older sonar data becoming dimmer and dimmer until it is not displayed.

In the preferred embodiment, once the sonar data has been referenced to a fixed frame of reference, it may be combined with radar information from a separate radar sensor enabling the display to show both below the water images with the sonar data and above the water images with radar at the same time in the same display. Additionally, with geo-referencing enabled, sonar and radar information can be overlayed on top of an electronic navigation chart with both the sonar and the radar data displayed with geo-referencing.

Figure 11:
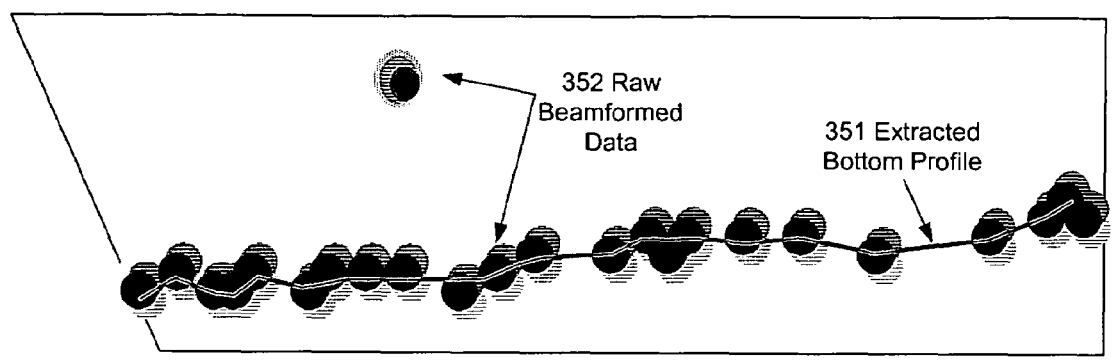
FIG. 11 illustrates a 2D slice extracted from 3D beamformed sonar data with color mapped to signal strength and with processed bottom extracted from the beamformed data which is drawn inconjunciton with the raw beamformed data.

In addition to these displays, in the preferred embodiment, raw beamformed data or partially processed data may be displayed in conjunction with processed data in the same view. Processed data such as algorithm extracted bottom maps and in water targets can be displayed on top of raw data. In FIG. 11, a vertical 2D slice through 3D data has been taken with the color/alpha mapped a signal property such as target strength or signal strength. On top of the raw data 352, the bottom profile extracted from processing routines is also drawn 351. The raw beamformed data may allow the user to better understand what type of target the system has detected. Colors/alpha may also be mapped to depth or other sonar properties. This display concept can be combined with target persistence. This display does not require a profile slice and may be used with other data displays such as 3D data sets and chart overlays.

What is claimed is:

1. A sonar system, comprising:
at least one sonar emitter;
at least one sonar sensor configured to receive an echo from a signal generated by the at least one sonar emitter, wherein the at least one sonar sensor generates a raw data signal;
at least one roll, tilt, and/or yaw sensor;
processing means for transforming the raw data signal to an image data, wherein said image data has been rotated responsively to the sonar sensor's orientation as determined by the at least one roll, tilt, and/or yaw sensor;
wherein said processing means generates a complete image with a single transmission;
wherein the roll, tilt, and/or yaw orientation of said image data with respect to a fixed frame of reference and the successive display of multiple image data is orientated in the same fixed frame of reference;
wherein the sonar sensor consists of multiple transducer elements and is configured in a Mills Cross orientation consisting of two orthogonal linear receivers; and
wherein the sonar emitter consists of a broad beam transmitter.

2. A sonar system, comprising:
at least one sonar emitter;
at least one sonar sensor configured to receive an echo from a signal generated by the at least one sonar emitter wherein the at least one sonar sensor generates a raw data signal;
at least one roll, tilt, and/or yaw sensor;
processing means for transforming the raw data signal to an image data, wherein said image data has been rotated responsively to the sonar sensor's orientation as determined by the at least one roll, tilt, and/or yaw sensor;
wherein said processing means generates a complete image with a single transmission;
wherein the roll, tilt, and/or yaw orientation of said image data with respect to a fixed frame of reference and the successive display of multiple image data is orientated in the same fixed frame of reference; and
wherein said image data is bounded by a geometrical shape which is specified with respect to said fixed frame of reference.

3. A sonar system, comprising:
at least one sonar emitter;
at least one sonar sensor configured to receive an echo from a signal generated by the at least one sonar emitter, wherein the at least one sonar sensor generates a raw data signal;
at least one roll, tilt, and/or yaw sensor;
processing means for transforming the raw data signal to an image data, wherein said image data has been rotated responsively to the sonar sensor's orientation as determined by the at least one roll, tilt, and/or yaw sensor;
wherein said processing means generates a complete image with a single transmission; and wherein the roll, tilt, and/or yaw orientation of said image data with respect to a fixed frame of reference and the successive display of multiple image data is orientated in the same fixed frame of reference; and
wherein bounds of a processing parameter is determined dynamically based upon the orientation of the sonar system with respect to said fixed frame of reference.

4. A sonar system, comprising:
means for processing sonar data into image data, wherein said image data is orientated with respect to a fixed frame of reference in a roll, tilt, and/or yaw orientation as determined by a plurality of sensors;
wherein said processing of the sonar data into image data allows for the display of multiple images from successive transmissions to be oriented with said fixed frame of reference;
wherein individual targets or sonar echo returns within a single image of said multiple images are grouped into at least one group based upon characteristics of a signal pertaining to said targets or sonar echo returns;
wherein visualization of said targets or sonar echo returns within the at least one group varies based upon said characteristics; and
wherein said at least one group is displayed.

5. The sonar system according to claim 4, wherein said targets or sonar echo returns are grouped by classifications based on one or more of the following criteria: spatial proximity to others, spatial location relative to fixed frame of reference, Doppler shift of signal, spectral content of signal, absolute amplitude of signal, range normalize amplitude of signal, spatial location relative to the sensor, roll, tilt, or yaw orientation of a sensor with respect to a fixed frame of reference, geometrical shape of target clusters, spatial proximity to features detected by external sensors, and spatial proximity to features from previous or successive transmissions.

6. The sonar system according to claim 5, wherein multi-path returns are removed from display consideration based upon their spatial proximity relative to location of a group of returns that are classified as the sea-floor and the location of the sea surface using said classifications.

7. The sonar system according to claim 5, wherein a minimum depth of targets within one or more groups of targets within a spatial volume relative the location and orientation of the sonar system with respect to said fixed frame of reference is displayed to a user or communicated to one or more external systems.

8. The sonar system according to claim 5, wherein a user displayed visualization of groups or targets within a group include one or more of the following techniques: display of target or group location within a 3-dimensional volumetric display with a graphical icon, display of target or group location within a 2-dimensional perspective display representing the 3-dimensional location of the target or group, display of target or group location in 3-dimensions as projected into a 2-dimensional display, the modification of said icon's transparency from alpha channel blending, the modification of said icon's coloring, the modification of said icon's graphical image, the blinking of said icon's graphical display, and the overlay of said icon on top of other information orientated to the same fixed frame of reference.

9. The sonar system according to claim 8, wherein information overlayed by said icon includes one or more of the following: radar, navigation chart, current chart, weather map, and a second icon representing the location of other objects with locations known relative to same fixed frame of reference.

10. The sonar system according to claim 8, wherein the system display includes one or more projections on to a 2-dimensional display of one or more surfaces which pass through the 3-dimensional image data.

11. The sonar system according to claim 8, wherein the user can translate and/or rotate the image data relative to the user's "camera" view.

12. The sonar system according to claim 8, wherein the location of the sonar system as represented by said icon can be displayed within the same display as the image data and oriented with the same fixed frame of reference.

13. The sonar system according to claim 12, wherein the position of said icon representing the sonar system's location is updated as new information relating to the sonar's location relative to the fixed frame of reference is acquired.

14. The sonar system according to claim 4, wherein said sonar emitter and sonar sensor are shaped such that they conform with the structure of a platform of a vessel's hull.

15. The sonar system according to claim 4, wherein the sonar sensor consists of multiple transducer elements and is configured in a Mills Cross orientation consisting of two orthogonal linear receivers; and wherein the sonar emitter consists of a broad beam transmitter.

16. A sonar system, comprising:

means for processing sonar data into image data, wherein said image data is orientated with respect to a fixed frame of reference in a roll, tilt, and/or yaw orientation as determined by a plurality of sensors;

wherein said processing of the sonar data into image data allows for the display of multiple images from successive transmissions to be oriented with said fixed frame of reference;

wherein individual targets or sonar echo returns within a single image of said multiple images are grouped into at least one group based upon characteristics of a signal pertaining to said targets or sonar echo returns; and wherein one or more of said groups are communicated to one or more external devices for further display, comparison, or navigation decision making based upon said classified characteristics.

17. The sonar system according to claim 16, wherein navigation decisions are made from image data and/or group classifications and outputted to a robotic device.

18. The sonar system according to claim 16, wherein the sonar sensor consists of multiple transducer elements and is configured in a Mills Cross orientation consisting of two orthogonal linear receivers; and wherein the sonar emitter consists of a broad beam transmitter.

19. The sonar system according to claim 16, wherein the sonar emitter and sonar sensor are shaped in such a way that they conform with the structure of the platform vessel's hull.

* * * * *